United States Patent [19]

Prakash

[11] Patent Number: 5,054,101
[45] Date of Patent: Oct. 1, 1991

[54] THRESHOLDING OF GRAY LEVEL IMAGES USING FRACTAL DIMENSIONS

[75] Inventor: Arun Prakash, West Chester, Pa.

[73] Assignee: E. I. Du Pont de Nemours and Company, Wilmington, Del.

[21] Appl. No.: 316,716

[22] Filed: Feb. 28, 1989

[51] Int. Cl.$^5$ ............................................. G06K 9/38
[52] U.S. Cl. ......................................... 382/50; 382/41
[58] Field of Search ...................... 382/41, 47, 49, 50, 382/56; 364/518, 521, 522; 340/729

[56] References Cited

U.S. PATENT DOCUMENTS

| | | | |
|---|---|---|---|
| 4,442,344 | 4/1984 | Moreland et al. | 382/53.68 |
| 4,468,704 | 8/1984 | Stoffel et al. | 358/282 |
| 4,501,016 | 2/1985 | Persoon et al. | 382/22 |
| 4,547,811 | 10/1985 | Ochi et al. | 358/280 |
| 4,656,665 | 4/1987 | Pennebacker | 358/51 |
| 4,685,145 | 8/1987 | Schiller | 382/52 |
| 4,694,407 | 9/1987 | Ogden | 364/728.01 |
| 4,710,822 | 12/1987 | Matsunawa | 358/280 |
| 4,731,863 | 3/1988 | Sezan et al. | 382/51 |
| 4,736,439 | 4/1988 | May | 382/54 |
| 4,742,557 | 5/1988 | Ma | 382/51 |

OTHER PUBLICATIONS

Barusley; M. et al., "Harnessing Chaos for Image Synthesis", *Computer Graphics*, vol. 22, No. 4, pp. 131-140, Aug. 1988.
Computers and Biomedical Research 5,388-410 (1972), pp. 388-410.
Proceedings, 6th International Conference on Pattern Recognition 1982, pp. 152-136.
Information Processing 71-North-Holland Publishing Company (1972) pp. 1530-1533.
*Scientific American* "Not Just a Pretty Face", Mar. 1990, pp. 77-78.
Barnsley and Sloan "A Better Way to Compress Images", *Byte*, Jan. 1988, pp. 215-223.

Primary Examiner—David K. Moore
Assistant Examiner—Jose L. Couso

[57] ABSTRACT

The locality of a two dimensional gray level image from which is generated a reference threshold value for converting the image to its corresponding binary image is determined by finding the fractal dimension of a hypothetical three dimensional surface overlying the two dimensional image.

8 Claims, 12 Drawing Sheets

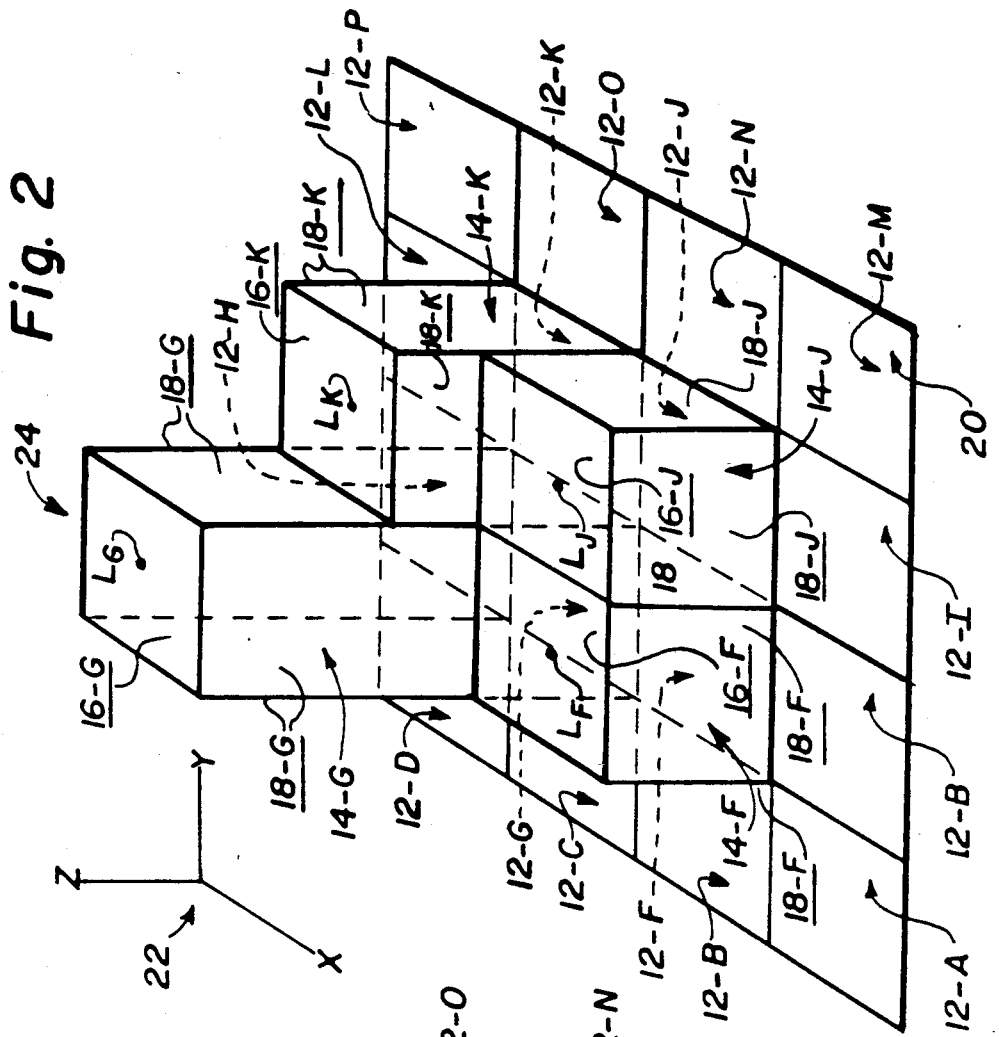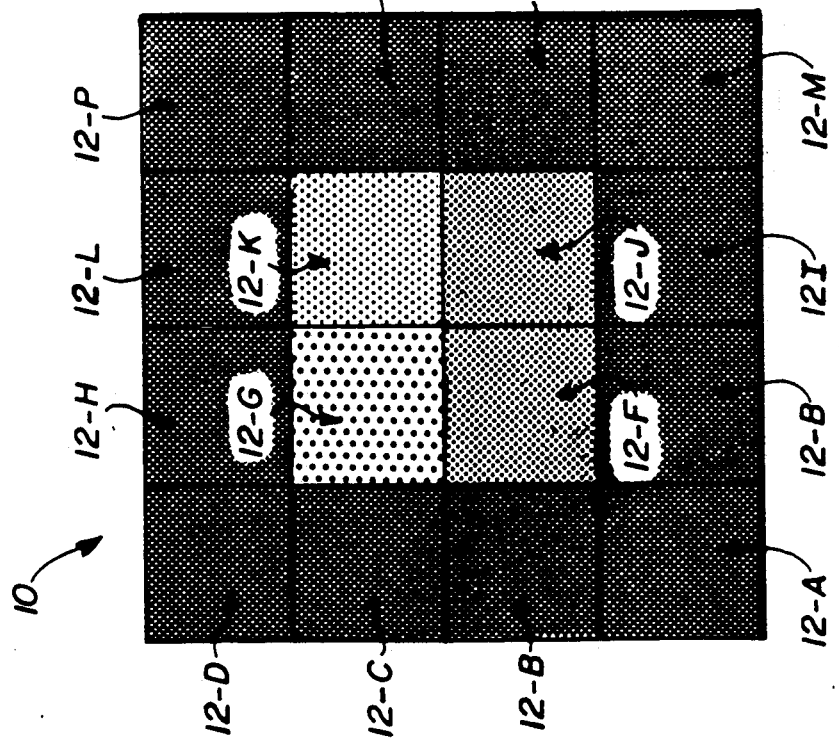

THRESHOLDING OF GRAY LEVEL IMAGES USING FRACTAL DIMENSIONS

A portion of the disclosure of this patent document contains material which is subject to copyright protection. The copyright owner has no objection to the facsimile reproduction by anyone of the patent document or patent disclosure, as it appears in the Patent and Trademark Office patent fie or records, but otherwise reserves all copyright rights whatsoever.

FIELD OF THE INVENTION

The present invention relates to a method and apparatus for analysis of two dimensional gray level images and, in particular, to a method and apparatus for such an analysis using fractal dimensions.

DESCRIPTION OF THE PRIOR ART

When presented with a gray scale image it is desirable, for various reasons, to convert the gray scale image into its corresponding binary image. To effect this conversion the image is subdivided into a predetermined number of picture elements ("pixels") and the gray level of each pixel is compared to a threshold value. In a typical case, if the gray level of the selected pixel exceeds the threshold value, the pixel is assigned a predetermined binary value. Alternatively, if the gray level is below the threshold, the alternate binary value is assigned to that pixel.

The threshold is typically determined as some predetermined functional relationship, typically the average, of the gray scale level of the pixels in a local portion, or locality, of the image surrounding the pixel of concern. The key consideration is how to determine the magnitude of the locality that is to be used to generate the threshold.

Examples of representative threshold schemes include those disclosed in U.S. Pat. No. 4,468,704 (Stoffel et al.), U.S. Pat. No. 4,442,544 (Moreland et al.), U.S. Pat. No. 4,547,811 (Ochi et al.), U.S. Pat. No. 4,710,822 (Matsunawa), U.S. Pat. No. 4,501,016 (Persoon et al.), U.S. Pat. No. 4,656,665 (Pennebaker), U.S. Pat. No. 4,736,439 (May), U.S. Pat. No. 4,685,145 (Schiller), U.S. Pat. No. 4,742,557 (Ma), and U.S. Pat. No. 4,731,863 (Sezan et al.).

SUMMARY OF THE INVENTION

In accordance with the present invention the locality of the image from which the threshold is derived is determined using the fractal dimensional of the image. From the two dimensional image the surface area A(r) of a corresponding hypothetical three dimensional surface overlying the plane of the two dimensional image is computed at various scales of resolution. The height that a portion of the hypothetical three dimensional surface lies above a given pixel in the two dimensional image is functionally related to the gray level of the pixel. The fractal dimension of the surface is determined by computing the change in the logarithm of the area A(r) with respect to the change in the logarithm of the scale of resolution r in accordance with the relationship $$D(r) = 2 - d[\log A(r)]/d[\log (r)].$$

The dimension of the locality correlates with the particular scale of resolution $r_{max}$ at which the fractal dimension is a maximum. In the preferred instance the locality is a square array of pixels the dimension of which exceeds the value $r_{max}$ by a predetermined facto, typically less than twenty percent (20%).

Once the dimension of the predetermined locality is determined using the fractal dimension of the image, a gray level value is computed. This gray level bears a predetermined functional relationship, typically an average, to the gray level of the pixels falling within the predetermined locality. This gray level value defines the threshold against which the gray level of a given pixel is compared. A binary value is assigned to the pixel in accordance with the results of the comparison.

In the preferred instance the invention is implemented using a digital computer operating in accordance with a program. Computational efficiency is believed obtained by computing the areas in the Fourier domain.

BRIEF DESCRIPTION OF THE DRAWINGS

The invention will be more fully understood from the following detailed description thereof, taken in connection with the accompanying drawings, which form a part of this application and in which:

FIG. 1 is an arbitrary two dimensional gray level image;

FIG. 2 is stylized pictorial three dimensional representation of a hypohetical surface corresponding to the gray level image of FIG. 1;

Figure 6:
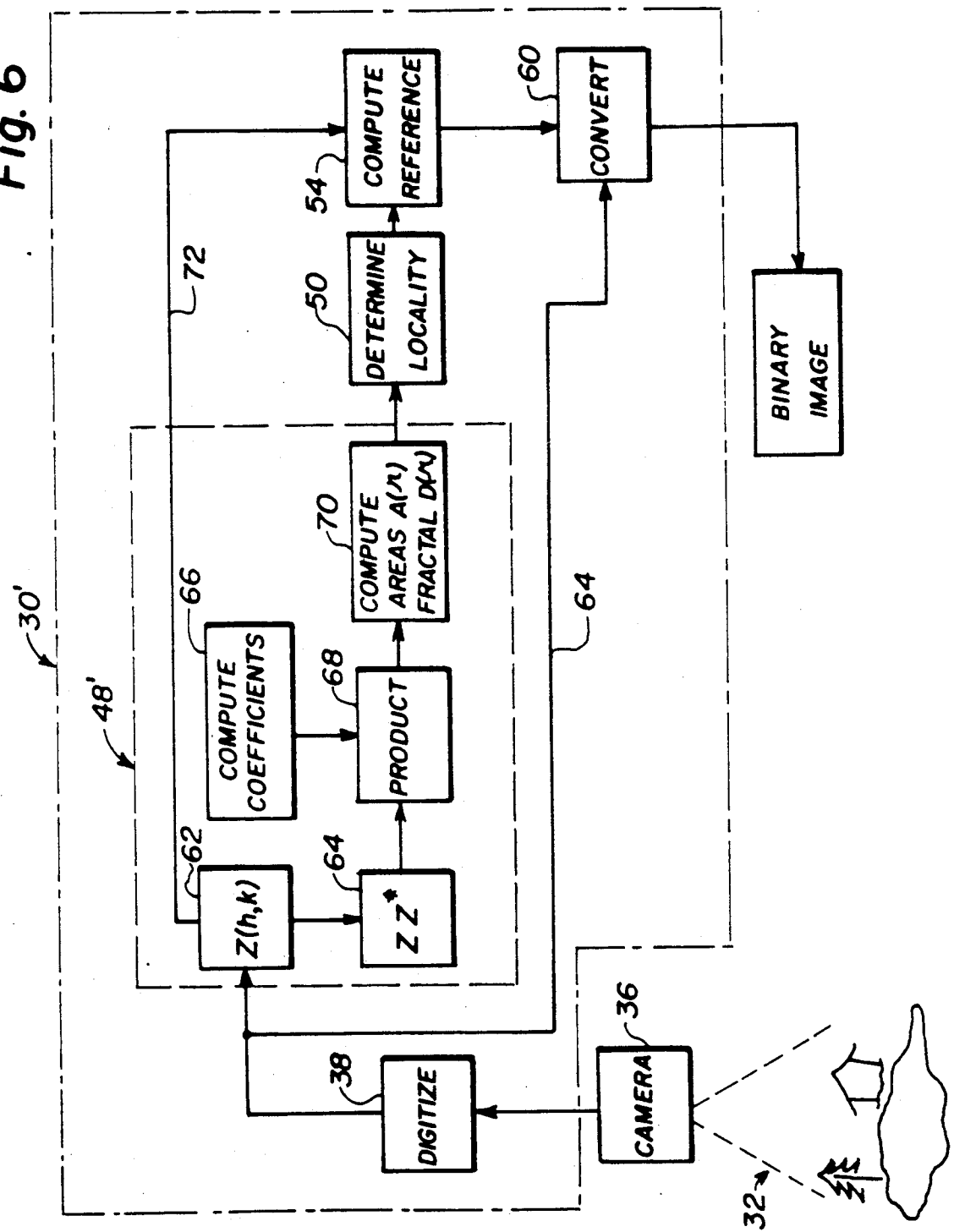
FIG. 6 is a more detailed block diagram of an apparatus for implementing the preferred embodiment of the present invention.

The Appendix comprising pages A-1 to A-9 is a listing of a computer program, in Fortran 77 source language, of a computer program for implementing the embodiment of the present invention set forth in FIG. 6.

DETAILED DESCRIPTION OF THE INVENTION

Throughout the following detailed description similar reference characters refer to similar elements in all figures of the drawings.

With reference to FIG. 1 shown is an arbitrary two dimensional gray level image 10. The image 10 is subdivisible into predetermined pixels identified by the reference characters 12-A through 12-P. The darkest of the pixels (that is, the pixels 12-A through 12-E, 12-H, 12-I, and 12-L to 12-P) are indicated for purpose of this application by speckled shading. These pixels are to be understood to have a gray level of zero. The pixels 12-F and 12-J are lighter, with the pixel 12-K being lighter still. The pixel 12-G is the lightest of the pixels. In terms of gray level, the pixel 12-G may be said to exhibit a gray level of $L_G$, the pixel 12-K the gray level $L_K$, and the pixels 12-F and 12-J the gray levels $L_F$ and $L_J$, respectively. The gray level of the $L_G$ is greater than the gray level $L_K$, which is, in turn, greater than the gray levels $L_F$ and $L_J$, FIG. 2 is a highly stylized hypothetical three dimensional representation of the gray level image 10 shown in FIG. 1. The image of FIG. 2 may be envisioned as a three dimensional surface composed of adjacent pylons 14. Each pylon 14 has an upper surface 16 and side surfaces 18. The distance that the upper surface 16 of a given pylon 14 overlies a base plane 20 is functionally related to the gray level of that pixel. In the system here presented, a pixel having a lesser gray extends a lesser distance above the base plane than a pixel having a greater gray level. The pylons 14 associated with the pixels 12-A through 12-E, 12-H, 12-I, and 12-L to 12-P are thus of height zero because the gray levels of the corresponding pixels in FIG. 1 are zero.

As seen in FIG. 2, since the pixel 12-G has a gray level of $L_G$ associated therewith the upper surface 16-G of the pylon 14-G is seen to extend a distance $L_G$ above the base plane 20. Similarly, since the pixel 12-K has a gray level $L_K$ associated therewith the upper surface 16-K of the pylon 14-K extends the distance $L_K$ above the base plane 20. The distance $L_K$ is less than the distance $L_G$, owing to the difference in gray levels of their corresponding pixels. Consistent with the foregoing, since the pixels 12-F and 12-J have the relatively lesser gray levels $L_F$ and $L_J$, respectively, the upper surfaces 16-F, 16-J of the pylons 14-F, 14-J, respectively, extend the distances $L_F$, $L_J$ above the base plane 20. As also seen in FIG. 2, for purposes of later discussion, the base plane 20 is shown to lie in the Cartesian x, y plane as indicated by the coordinate axes 22. The z-axis indicates gray level intensity L.

The point to be noted is that the two dimensional image 10 may be mapped into three dimensional space, with the gray level of the pixels 12 in the two dimensional image 10 being used to define the contours of a hypothetical surface 24 in three dimensional space. Any two dimensional gray level image 10 may be converted to a corresponding three dimensional surface 24 using the principle illustrated in simplistic fashion in FIGS. 1 and 2.

Once a two dimensional image 10 is defined as a hypothetical three dimensional surface 24 (with the height of the surface above the base plane 20 at a given position defined by the x, y coordinates in the plane 20 being functionally related to the gray level of the corresponding image that position) then the area of the surface can be approximated.

—o—O—o—

The fractal dimension of a three dimensional surface may be viewed intuitively as a measure of the "jaggedness" of a surface in three dimensional space. The fractal dimension may be more rigorously mathematically defined as being related to the change in the logarithm of the area A of the surface at various scales of resolution r with respect to the logarithm of the scale of resolution r. Symbolically, $$D(r)=2-d[\log A(r)]/d[\log(r)] \quad (1)$$

where
D is a fractal dimension;
r is the scale of resolution; and
A(r) is the area of the surface at scale of resolution r.

Imaging a real scene at different resolution scales can be achieved by varying the magnification of the imaging device. However, it is not possible to vary the magnification of an image stored in a computer memory. An effect similar to that achieved by magnification can be performed on computer stored images by convolving the surface 24 with a smoothing window of sides equal to the scale of the resolution r being simulated. In this manner the area A of a three dimensional surface 24 corresponding to the two dimensional gray level image 10 may be computed at a each of a predetermined number of scales of resolution r.

Figure 3:
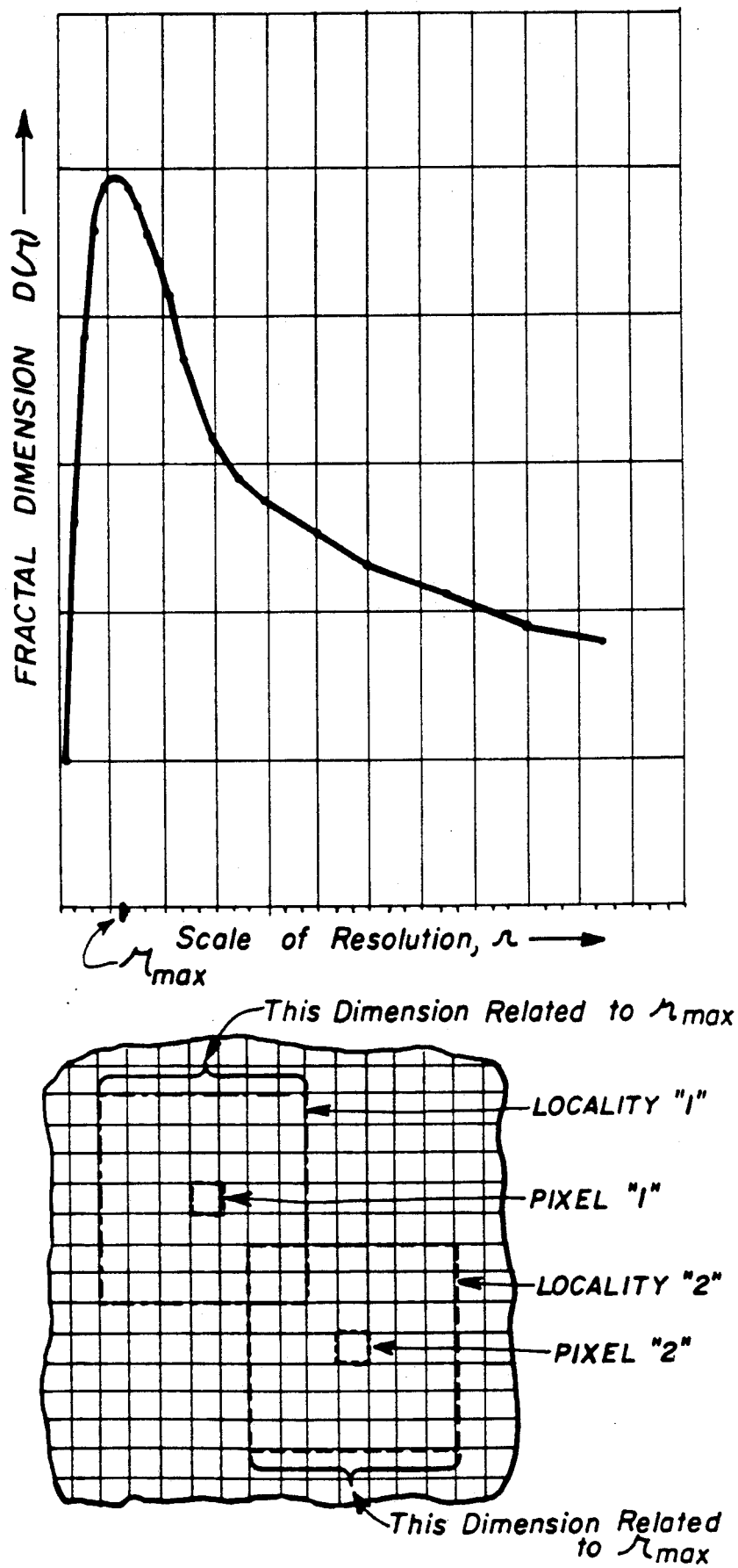
FIG. 3 is a graphical depiction of the fractal dimension of a three dimensional surface representative of a two dimensional image as a function of scale of resolution.

If the fractal dimension D(r) of the hypothetical three dimensional surface as computed by Equation (1) is plotted as a function of the scale of resolution r, as shown in the upper portion of FIG. 3, the curve will exhibit a peak at a certain value of r, hereafter referred to as $r_{max}$. It has been found that in accordance with the present invention the peak of the plot occurs at the value $r_{max}$ that is closely related to the average distance between features of interest in the two dimensional image.

In accordance with the present invention, it has been found that the value $r_{max}$ of the scale of resolution r at which occurs the peak of the plot of the fractal dimensional serves as a useful guide in defining the locality from which the reference gray level value is derived. This relationship is illustrated in the lower portion of FIG. 3. Of course, as pointed out earlier, this reference value may be used in converting the two dimensional gray level image 10 to a corresponding binary image.

The locality may be defined as an array of pixels that lie within a predetermined distance of a pixel of interest, where the predetermined distance is related to the value $r_{max}$ of the scale of resolution at which the fractal peak occurs. The locality may be formed as a square array of its constituent pixels, a circular array, or any other predetermined shape. It is preferred that the locality take the form of the square array centered on the pixel of interest, with the dimension of each side of the array being related to the value $r_{max}$. In the lower portion of FIG. 3, two localities are shown. The localities 1 and 2 are shown as square arrays of pixels respectively surrounding two given pixels of the image, the pixels 1 and 2. Each square array has a dimension related to the $r_{max}$ value. The pixel of interest should lie as close as possible to the center of the locality.

If the dimension of such a square array of pixels is chosen to be smaller than the scale of resolution $r_{max}$ there is the possibility that there with be localities within the image that have no features of interest in them. Such a situation will introduce noise into the converted image. Conversely, if the dimension is chosen to be much larger than the value $r_{max}$, then the ability to handle background viarations decreases. The goal is to choose the smallest locality that contains both feature and background. Choosing the predetermined dimension which defines the square locality to be slightly larger than the value of $r_{max}$ appears to do just that. By "slightly larger" it is meant that the predetermined distance is no more than twenty percent (20%) greater than the value $r_{max}$. That is, the dimension of the square exceeds the value $r_{max}$ by less than twenty percent (20%).

For localities shaped other than square, at least one of their dimensional parameters is related to the value $r_{max}$.

Once the locality is defined, the reference threshold is computed for the pixel surrounded by that locality. In the preferred instance the threshold is computed by averaging the gray level of each pixel in that locality. However, it should be realized that the threshold may satisfy any predetermined functional relationship with the gray levels of the pixels in the locality.

The gray level of a given pixel is then compared to the threshold derived from its surrounding locality, and the pixel is assigning a binary value in accordance with the results of the comparison. In the preferred instance if the gray level of the selected pixel exceeds the threshold value computed from its locality, the pixel is assigned a predetermined binary value. If the gray level is below the threshold computed from its locality, the alternate binary value is assigned to that pixel.

The reference threshold is computed for each pixel in the image in an analagous manner, using a locality for each pixel that has the same dimension and same square shape.

—o—0—o—

The entire procedure depends on the computation of areas of the hypothetical three dimensional surface at different scales of resolution. Consider first the process of surface area computation. It may be envisioned if, firstly, one imagines each pylon of FIG. 2 as being replaced by a corresponding line 28 (FIG. 4) extending in the z direction and positioned at the center of the pixel from which the pylon emanates. The height of a line 28 is equal to the height of the pylon it replaces. The entire image is thus reduced to a series of lines of varying heights in the z direction. Next, the surface may be envisioned if one considers an elastic sheet placed on such a series of lines such that the sheet rests and touches the top of every line and stretches as a continous surface therebetween. The surface area of such a stretched sheet is the hypothetical the surface area of the image.

Figure 4:
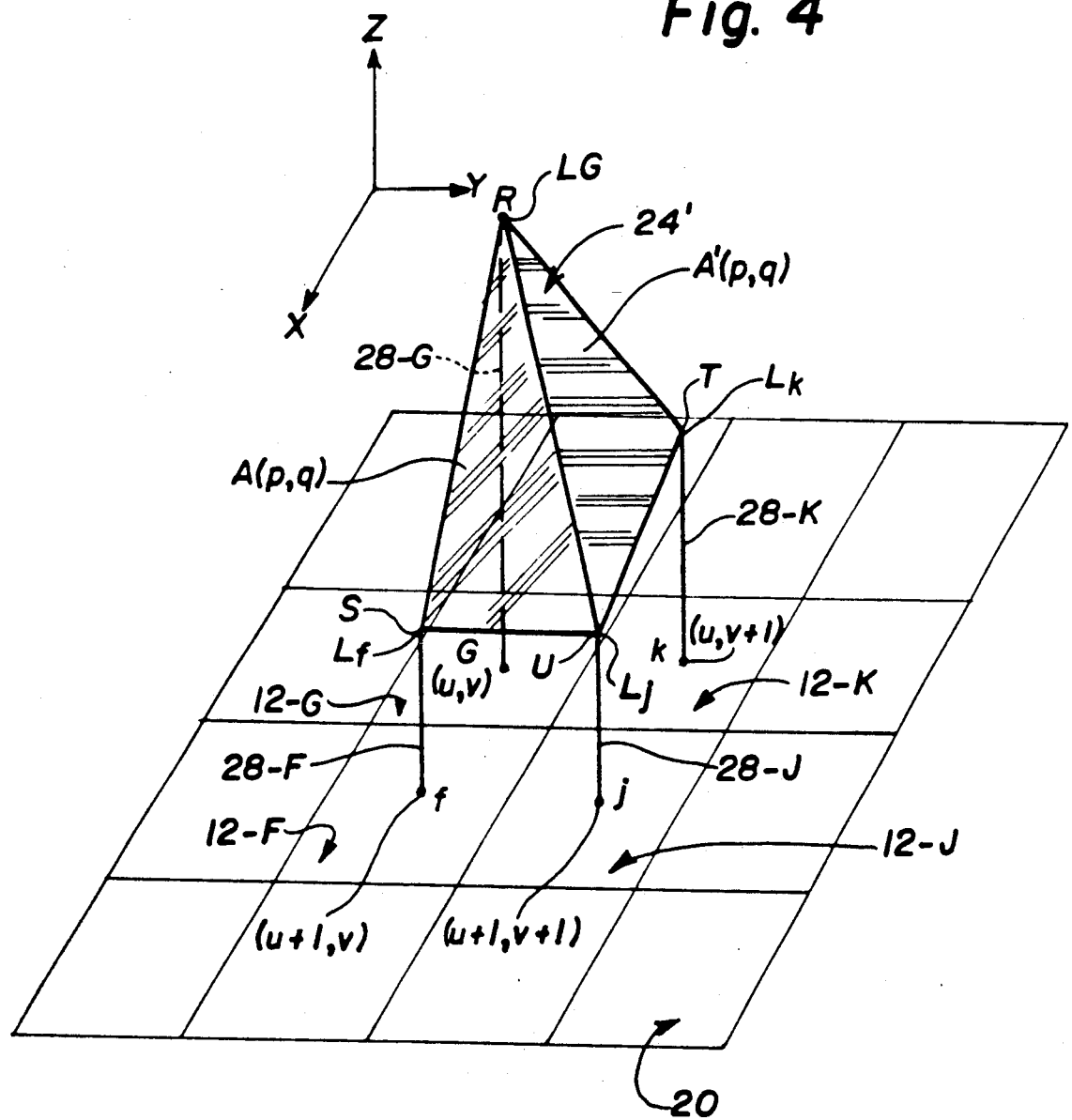
FIG. 4 is a diagrammatic representation of an approximation from which the surface area of the hypothetical three dimensional representation shown in FIG. 2 of the gray level image of FIG. 1 may be computed in accordance with the present invention.

FIG. 4 shows a diagrammatic representation of an approximation 24' to the hypothetical surface area described above. Since the base plane 20 is defined to lie in the plane of the coordinate axes x, y, then let pixel 12-G be located by reference to coordinates (u, v). The pixel 12-K is then located by reference to coordinates (u, v+1), the pixel 12-F is located by reference to coordinates (u+1, v), and the pixel 12-J is located by reference to coordinates (u+1, v+1).

For any pixel located at position (u, v) in the x, y plane let l(u, v) be its gray level. Thus, for the pixels 12-G, 12-K, 12-F and 12-J $l(u, v) = L_G$ $l(u, v+1) = L_K$ $l(u+1, v) = L_F$ $l(u+1, v+1) = L_J$ The lines 28-G, 28-K, 28-F and 28-J extending perpendicularly to the x, y plane of FIG. 4 to the points $L_G$, $L_K$, $L_F$, $L_J$, correspond to the lines 28 replaced the pylons 14, as discussed above.

The point (u, v, $L_G$) is indicated in FIG. 4 by the character R, the point (u+1, v, $L_F$) is indicated by the character S, the point (u, v+1, $L_K$) is indicated by the character T, and point (u+1, v+1, $L_J$) is indicated by the character U. If the points R, S and U are joined, a triangle having an area A(u, v) is formed. Similarly, if the points R, T and U are joined, a triangle having an area A'(u, v) is formed.

In like manner triangles may be drawn between neighboring pixels across the entire image. For an N×N image the areas are A(0,0), A'(0,0) ... A(N−1, N−1), A'(N−1, N−1). The surface area A(r) of the image is, in accordance with this invention, the sum over all p and over all q of the areas A(p, q) and A'(p, q) of the triangles. Symbolically, $$A(r) = \sum_{p=0}^{N-1} \sum_{q=0}^{N-1} A(p,q) + A'(p,q) \qquad (2)$$

where p and q range from zero to (N−1).

Next consider the process of smoothing the image to simulate a change of scale of resolution r. A(1) is the surface area of the original unsmoothed image (i.e., at the scale 1). To find the surface area at scale r, the original image is first smoothed using an r×r window. This is accomplished by replacing every pixel intensity of the original image with the average intensity of all the pixels that fall within an r×r window around it. This is done for all the pixels of the original image, resulting in a smoothed image. Once the smoothed image is available, its area A(r) may be computed as described earlier. In this manner A(r) is computed for a range of scales r. Finally D(r) is computed in accordance with Equation (1).

As described above, in order to compute the fractal dimension D(r) it is necessary to smooth the image and compute its surface area repetitively over a range of values of r. In practice, to implement the present invention in the spatial (or real) domain is computationally expensive. Therefore, in the preferred instance, the invention is implemented in the Fourier domain using a digital computer with an associated array processor. This methodology will be understood from the following discussion.

As developed earlier and as shown in FIG. 4 the triangles RSU and RTU can be formed by joining any three points in three dimensional space. The area of such a triangle is one-half the magnitude of the vector resulting from the cross product of any two vectors that form the sides of the triangle. For pixel (p, q) this is given by:

$A(p, q) = \frac{1}{2}\{[l(p+1, q) - l(p, q)]^2 + [l(p1, q+1) - l(p+1, q)]^2 + 1\}^{\frac{1}{2}}$ $A'(p, q) = \frac{1}{2}\{[l(p, q+1) - l(p, q)]^2 + [l(p, q+1) - l(p+1, q+1)]^2 + 1\}^{\frac{1}{2}}$ The sum of A(p, q) and A'(p, q) over all p, q is the approximate surface area of the image. However, what is done instead is to sum the squares of each of the areas. This results in computational simplicity. Also, it can be shown that the primary interest is in the way the surface area varies with a change in scale for a single image. The absolute fractal dimension value is not important for determining the size of the locality. Summing the squares of the areas of the triangles actually accentuates the variation in surface area with scale, which is desirable.

Now, the area $[A(p, q)]^2$ is:

$$[A(p, q)]^2 = \tfrac{1}{2}\{[l(p+1, q) - l(p, q)]^2 + [l(p+1, q+1) - l(p+1, q)]^2 + 1\}$$

and the area $A'(p, q)$ is:

$$[A'(p, q)]^2 = \tfrac{1}{2}\{[l(p, q+1) - l(p, q)]^2 + [l(p, q+1) - l(p+1, q+1)]^2 + 1\}$$

Therefore the total across the image is $$\text{Total Area} = \tfrac{1}{2} \sum_{p=0}^{N-1} \sum_{q=0}^{N-1} [l(p+1, q) - l(p, q)]^2 + \tag{3}$$

$$\tfrac{1}{2} \sum_{p=0}^{N-1} \sum_{q=0}^{N-1} [l(p+1, q+1) - l(p, q+1)]^2 +$$

$$\tfrac{1}{2} \sum_{p=0}^{N-1} \sum_{q=0}^{N-1} [l(p+1, q+1) - l(p+1, q)]^2 +$$

$$\tfrac{1}{2} \sum_{p=0}^{N-1} \sum_{q=0}^{N-1} [l(p, q+1) - l(p, q)]^2 +$$

$$\tfrac{1}{2} \sum_{p=0}^{N-1} \sum_{q=0}^{N-1} 1$$

A reasonable approximation of Equation (3) is:

$$\text{Total Area} = \tfrac{1}{2} \sum_{p=0}^{N-1} \sum_{q=0}^{N-1} [l(p+1, q) - l(p, q)]^2 + \tag{4}$$

$$\tfrac{1}{2} \sum_{p=0}^{N-1} \sum_{q=0}^{N-1} [l(p, q+1) - l(p, q)]^2 +$$

$$\tfrac{1}{2} \sum_{p=0}^{N-1} \sum_{q=0}^{N-1} 1$$

Equation (4) gives a sum of the squares of the surface area elements at scale of resolution r. In order to find the surface area for different scales the original image is first smoothed by a flat square smoothing window with sides of length equal to the scale factor and then the surface area of the image is computed.

—o—0—o—

Described next is another method of appoximating the smoothing and area computation. This method speeds the computation.

Let $Y(k, h)$ be the Fourier transform of $l(p, q)$, a smoothed version of the original image $F(m, n)$, where k, h, p, q, m and n are variables that can take integer values from zero to $(N-1)$.

$$Y(k, h) = \sum_{p=0}^{N-1} \sum_{q=0}^{N-1} l(p, q) W^{(kp+hq)} \tag{5}$$

where $W^{(kp+hq)} = \exp[-i(2\pi/N)(kp+hq)]$, and $i = \sqrt{-1}$ $l(p+1, q)$ is a shifted version of $l(p, q)$. Therefore, the Fourier transform is:

$$W^{-k} Y(k, h) \tag{6}$$

Applying Parsevals Theorem (which states that the energy of the image is the same in both the spatial domain and the Fourier domain) to Equation (4):

$$A(r) = 1/(2N^2) \sum_{k=0}^{N-1} \sum_{h=0}^{N-1} \|(W^{-k} - 1)Y(h,k)\|^2 + \tag{7}$$

$$1/(2N^2) \sum_{k=0}^{N-1} \sum_{h=0}^{N-1} \|(W^{-h} - 1)Y(h,k)\|^2 + \tfrac{1}{2} \sum_{k=0}^{N-1} \sum_{h=0}^{N-1} 1$$

As mentioned earlier $l(p, q)$ is a smoothed version of the original image $F(m, n)$. The smoothing window used to find the surface area $A(r)$ is an $r \times r$ flat window of height $1/r^2$.

$$l(s, t) = 1/r^2 [F(m, n) + F(m+1, n) + \ldots + \tag{8}$$

$$F(m+r-1, n) + F(m, n+1) + F(m+1, n+1) + \ldots +$$

$$F(m+r-1, n+1) + \ldots + F(m, n+r-1) + \ldots +$$

$$F(m+r-1, n+r-1)]$$

where
$s = m - 1 + (r/2)$, $t = m - 1 + (r/2)$ for r even, and
$s = m - 1 + [(r-1)/2]$, $t = m - 1 + [(r-1)/2]$ for r odd.

Each term within the parenthesis of Equation (8) is a shifted version of the original image $F(m, n)$. In the Fourier domain, if $Z(k, h)$ is the Fourier Transform of $F(m, n)$ then $$Y(k, h) = Z(k, h)r^{-2}[1 + W^{-k} + \ldots + W^{-(r-1)k} \tag{9}$$

$$+ W^{-h} + W^{-k}W^{-h} + \ldots + W^{-(r-1)k}W^{-h}$$

$$+ .$$

$$.$$

$$.$$

$$+ W^{(r-1)h} + \ldots + W^{-(r-1)k}W^{-(r-1)h}]$$

The term in brackets in Equation (9) can be written as:

$$(1 + W^{-h} + \ldots + W^{-(r-1)h})(1W^{-k} + \ldots + W^{-(r-1)k})$$
$$= [(1 - W^{-rh})/(1 - W^{-h})][(1 - W^{-rk})/(1 - W^{-k})] \tag{9A}$$

Therefore Equation (9) can be written as $$Y(k, h) = [Z(k, h)/r^2][(1 - W^{-rh})(1 - W^{-rk})] / [1 - W^{-h})(1 - W^{-k})] \tag{10}$$

Substituting Equation (10) into Equation (7):

$$A(r) = 1/(2N^2 r^4) \sum_{k=0}^{N-1} \sum_{h=0}^{N-1} Z(k, h) Z^*(k, h) \times \tag{11}$$

$$[(W^{-k} - 1)(W^k - 1)(1 - W^{-rh})(1 - W^{-rk})(1 - W^{rh})(1 - W^{rk})] /$$

$$[(1 - W^{-h})(1 - W^{-k})(1 - W^h)(1 - W^k)] +$$

$$1/(2N^2 r^4) \sum_{k=0}^{N-1} \sum_{h=0}^{N-1} Z(k,h) Z^*(k,h) \times$$

$$[(W^{-h} - 1)(W^h - 1)(1 - W^{-rh})(1 - W^{-rk})(1 - W^{rk})(1 - W^{rh})] /$$

$$[(1 - W^{-h})(1 - W^{-k})(1 - W^h)(1 - W^k)] + \tfrac{1}{2} \sum_{k=0}^{N-1} \sum_{h=0}^{N-1} 1$$

Now it is known that, $$W^{-h} = \exp[i(2\pi/N)h] = \cos(2\pi/N)h + i \sin(2\pi/N)h \tag{11A}$$

Using this identity Equation (11) may be written as $$A(r) = 1/(2N^2 r^4) \sum_{k=0}^{N-1} \sum_{h=0}^{N-1} Z(k, h) Z^*(k, h) \times \quad (12)$$

$$[(2 - 2\cos(2\pi/N)rk)][(2 - 2\cos(2\pi/N)rh)]/[(2 - 2\cos(2\pi/N)h] +$$

$$1/(2N^2 r^4) \sum_{k=0}^{N-1} \sum_{h=0}^{N-1} Z(k, h) Z^*(k, h) \times$$

$$[(2 - 2\cos(2\pi/N)rk)][(2 - 2\cos(2\pi/N)rh)]/[(2 - 2\cos(2\pi/N)k] +$$

$$\sum_{k=0}^{N-1} \sum_{h=0}^{N-1} 1$$

or $$A(r) = 1/(N^2 r^4) \sum_{k=0}^{N-1} \sum_{h=0}^{N-1} Z(k, h) Z^*(k, h) \times \quad (13)$$

$$[(1 - \cos(2\pi/N)rk)][(1 - \cos(2\pi/N)rh)]/[(1 - \cos(2\pi/N)h] +$$

$$1/(N^2 r^4) \sum_{k=0}^{N-1} \sum_{h=0}^{N-1} Z(k, h) Z^*(k, h) \times$$

$$[(1 - \cos(2\pi/N)rk)][1 - \cos(2\pi/N)rh]/[1 - \cos(2\pi/N)k] + N^2/2$$

Equation (13) can be rearranged as follows:

$$A(r) = N^2/2 + 1/(N^2 r^4) \sum_{k=0}^{N-1} \sum_{h=0}^{N-1} Z(k, h) Z^*(k, h) \times \quad (14)$$

$$[(1 - \cos(2\pi/N)rk)][(1 - \cos(2\pi/N)rh] \times \{1/[1 - \cos(2\pi/N)h] +$$

$$1/[1 - \cos(2\pi/N)k]\}$$

The computation implied in Equation (14) can be reduced by a factor of two by observing the symmetry therein. It is known that for a real image the Fourier Transform is conjugate symmetric about the origin. Thus, the summation terms can be broken into two summation terms as follows:

$$\sum_{k=0}^{N-1} \sum_{h=0}^{\frac{N}{2}-1} [(1 - \cos(2\pi/N)rk)][(1 - \cos(2\pi/N)rh] \times \quad (15)$$

$$\{(1/[1 - \cos(2\pi/N)h]) + (1/[1 - \cos(2\pi/N)k])\} Z(k, h) Z^*(k, h) +$$

$$\sum_{k=0}^{N-1} \sum_{h=\frac{N}{2}}^{N-1} [(1 - \cos(2\pi/N)rk)][(1 - \cos(2\pi/N)rh] \times$$

$$\{(1/[1 - \cos(2\pi/N)h]) + (1/[1 - \cos(2\pi/N)k])\} Z(k, h) Z^*(k, h)$$

The second summation of Equation 15 can be rewritten as $$\sum_{k=0}^{N-1} \sum_{h=0}^{\frac{N}{2}-1} [(1 - \cos(2\pi/N)rk)][(1 - \cos(2\pi/N)r(N - h)] \times$$

$$\{(1/[1 - \cos(2\pi/N)(N - h)]) +$$

$$(1/[1 - \cos(2\pi/N)k])\} Z(k, N - h) Z^*(k, N - h)$$

Noting that $\cos(2\pi/N)(N - h) = \cos(2\pi/N)h$ and that $Z(k, N - h) = Z^*(k, h)$ Equation 14 reduces to $$A(r) = N^2/2 + \quad (16)$$

$$(2/N^2 r^4) \sum_{k=0}^{N-1} \sum_{h=0}^{\frac{N}{2}-1} [(1 - \cos(2\pi/N)rk)][(1 - \cos(2\pi/N)rh] \times$$

$$\{(1/[1 - \cos(2\pi/N)h]) +$$

$$(1/[1 - \cos(2\pi/N)k])\} Z(k, h) Z^*(k, h)$$

The computation of the areas A(r) is performed as shown in Equation (16). In this form, the smoothing and area computation steps are both merged into one nonlinear operation. Implementation of this equation in a suitable manner offers the advantage of speed. This is so because the coefficients that multiply the image Fourier Transform are independent of the image, and can be pre-computed and stored in memory for use when needed. In addition since the Fourier Transform assumes periodicity over all space the localities for pixels near edges and corners of the image automatically include pixels from the wrapped-around image.

-o-0-o-

Figure 5:
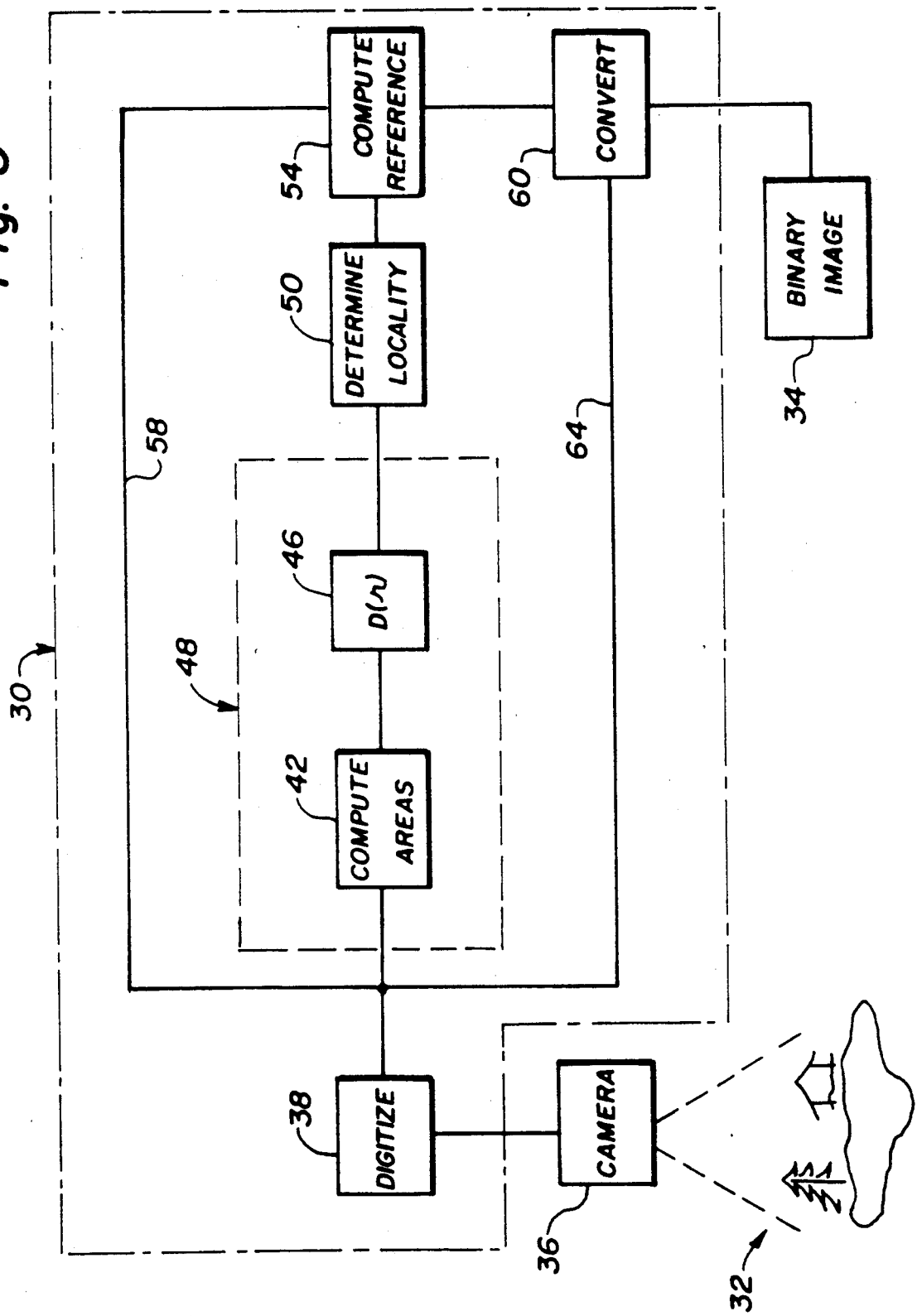
FIG. 5 is a generalized block diagram of an apparatus for implementing the present invention.

With reference to FIG. 5 shown is a block diagram of an apparatus generally indicated by reference character 30 for converting a two dimensional gray level image of a real world scene, schematically indicated at 32, to a corresponding binary image 34. A camera or other suitable image acquisition device 36 creates a two dimensional gray level image of the scene 32. Means generally indicated at 38 digitizes the image produced by the camera 36 and subdivides it into a predetermined number of picture elements (pixels) each of which has a gray level associated therewith. The image is arranged in a square format in an arrangement N×N pixels.

Means generally indicated at 42 is operative to compute from the digitized gray level representation of the two dimensional image the surface area A(r) of a corresponding hypothetical three dimensional surface overlying the plane of the two dimensional image at various scales of resolution. As discussed in connection with FIGS. 1 to 3, the height that a portion of the surface lies above a given pixel in the two dimensional image is functionally related to the gray level of the pixel. In general, the means 42 implements the computation of the surface areas in accordance with Equation (2).

Means generally indicated at 46 is operative to compute the fractal dimension of the surface in accordance with Equation (1). The results of such a computation are graphically illustrated in FIG. 3.

Means 50 is responsive to the results of the computation of the fractal dimension carried out by the means 46 to determine the magnitude of the locality from which the reference gray level value is derived. The magnitude of the locality is, as discussed, related to the value $r_{max}$ (FIG. 3) which defines the predetermined distance about a given pixel from which a reference for that pixel will be determined.

Means 54 is operative in response to the determination of the size of the locality produced in the means 50 and to the actual gray level value of the pixels within the locality (as applied over a line 58) to generate a reference threshold value for every pixel in the image. The reference threshold value for a given pixel is, thus, functionally related to the gray level of pixel in the locality. Preferably the reference is generated using a straight forward average of gray levels. However, it should be understood that other functional relationships, making use of all or less than all of the pixels in the locality, may be used.

Means 60 is operative to convert the gray level of each pixel in the two dimensional image into a corresponding binary representation thereof. This is accomplished by comparing the gray level of each pixel (as applied over the line 64) with the reference threshold gray level of that pixel (derived from the means 54). A binary value is assigned to each pixel in accordance with the results of the comparison. The corresponding binary image 34 is the result.

The apparatus 30 is preferably implemented using a digital computer operating in accordance with a program. However, as noted earlier, the implementation in the spatial domain of the functional blocks grouped together at 48 in FIG. 5, namely the areas computation (means 42) and the fractal dimension computation (means 46), may be computationally expensive. Accordingly, as seen in FIG. 6, shown is a block diagrammatic representation of an apparatus 30', similar to the apparatus 30 shown in FIG. 5, for implementing the invention in the Fourier domain. In general, the apparatus 30' is similar to that shown in FIG. 5 with the primary difference lying in the collection of functional elements within a functional block 48' that computes the areas and the fractal dimension in accordance with the methodology derived in connection with the discussions of Equations (5) through (16).

The embodiment of the invention shown in FIG. 6 may be implemented using a digital computer operating in accordance with a program. The Appendix to this application contains a listing, in Fortran 77 language, of a program operative to perform the functions to be described. Pages A-1 and A-2 of the listing set forth the main portion of the program. In the preferred implementation the apparatus is implemented by a MicroVAX Digital Computer manufactured and sold by Digital Equipment Corporation, coupled with an array processor manufactured and sold by Sky Computers, Inc. as the Sky Warrior Array Processor. The means 38 may be implemented by a frame grabber manufactured and sold by Data Translation Incorporated as DT2658.

The means 48' in the embodiment of FIG. 6 includes means 62 operative to compute the Fourier Transform of the image derived from digitizing means 38. That is, the term $Z(k, h)$ in Equation (16) for all k and h is calculated. Commercially available subroutines are available to perform such a calculation. For example, the program VSFFT, available from Sky Computer Inc. for use with the array processor identified above. Of course, implicit in the foregoing is the recognition that the data from which the transform is computed must be presented to the subroutine in a manner in which the subroutine is able to handle. For example, appropriate data manipulations must be performed to permit the referenced single dimension transform subroutine to perform twice the required manipulations to form a two dimensional transform. Such manipulations are within the skill of the art. With reference to the listing, the calculation of the two dimensional Fourier Transform, including the call to the subroutine VSFFT, is performed by the subroutine FRFT set forth at page A-4 of the listing. The actual calculation of the Transform is performed by the portion of the code indicated by the block 62.

The Fourier Transform derived in block 62 is applied to means generally indicated by the character 64 for computing the squared magnitude of the Transform. That is, the means 64 is responsive to the Transform derived in block 62 to produce $[Z(k, h) Z^*(k, h)]$ set forth in Equation (16). The values of the term $[Z(k, h) Z^*(k, h)]$ are stored in a magnitude matrix (IFFT) having dimensions $(N \times N/2)$. These calculations are performed in the portion of the code identified by the block 64 on page A-4 of the listing.

Means 66 computes the coefficients which are set forth as the terms:

$$[1/[1-\cos(2\pi/N)k]]+[1/[1-\cos(2\pi/N)h]]$$

in Equation (16). The values of the coefficient terms are stored in a coefficient matrix COSSES also having dimensions $(N \times N/2)$. The code implementing the coefficient calculation is set forth in the subroutine COSSES at page A-3 of the Appendix. The values of the coefficients for any given integer value of k and h may be found by simply looking to the appropriate term in the matrix. Special cases occur when $k=0$ or $h=0$. When both k and h are zero, as seen from Equation (16), the coefficient multiplying $[Z(0, 0) Z^*(0, 0)]$ is zero. Accordingly the term at (0, 0) in the stored coefficient matrix is set to zero. For the special instances: (1) when $k=0$ and h does not equal 0; or (2) when k does not equal 0 and $h=0$; the values of the coefficient matrix are set equal to one.

Means 68 serves to generate a product matrix which is the product of the magnitude matrix (produced by the means 64) and the coefficient matrix (produced by the means 66). In addition, the resulting product is scaled by a factor of $(1/N^2)$, corresponding to the scaling term found in Equation (16). The code performing the production of the product matrix is set forth at page A-4 of the Appendix. The resulting product matrix, termed the matrix "IFFT" in the code, is available for each integer r.

The areas and the fractal dimension are computed in the means 70. The portion of the code implementing these functions is set forth in the subroutine FRACTL appearing at pages A-6 and A-7 of the Appendix. The actual calculation of the fractal dimension for various scales of resolution r is set forth in the code at page A-7 of the listing. In terms of the earlier discussion the result of this calculation could be presented in the form of a graph similar to that depicted in FIG. 3.

The output of the means 70 is applied to the means 50 to determine the locality, as discussed earlier. The subroutine FRACTL at page A-7 of the Appendix performs this function. This block derives the magnitude of the locality by scaling the resolution value r at which the peak fractal dimension occurred by the predetermined factor.

Once the magnitude of the locality is determined the reference gray level for the locality is then calculated in the means 54, using the Fourier Transform $Z(h, k)$ derived in the means 62 and applied over the line 72. The portion of the code where this is implemented is set forth at pages A-8 and A-9 of the Appendix.

The image is converted in the means 60 as implemented as set forth at page A-2 of the Appendix.

-o-0-o-

Naturally occurring objects tend to have a fractal dimension that is very nearly constant over a certain range of scales or magnifications. What has been observed in accordance with the present invention is that the fractal dimension curve (as a function of r) peaks for a certain value of r. For images that have a homogeneous (though random) texture, it has been found that where the peak occurs, i.e. the value of $r_{max}$ at which occurs the peak value of $D(r)$, is very strongly correlated to the average size and spacing of the features in the texture.

The following photographs and discussion will make it clear that the invention, as implemented in accordance with the embodiment of FIG. 6, is able to overcome the effects of image background variations that attend image conversion when a single gray level reference is selected for the entire image. In addition the photographs will indicate that the invention is operative for any scale of magnification of the image.

Figure 7A:
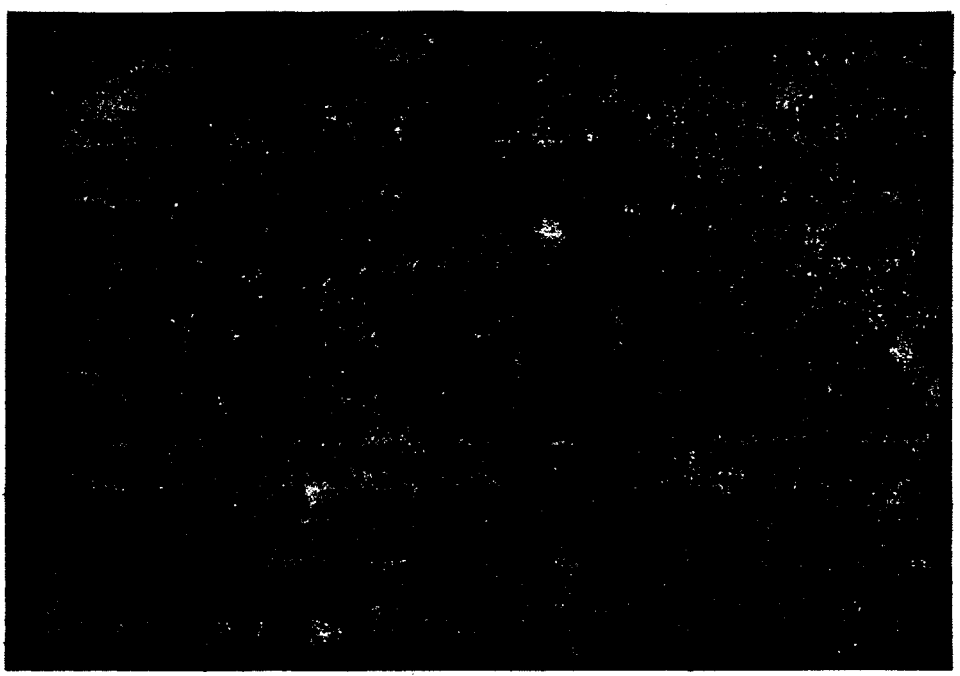
FIGS. 7A, 7B and 7C are photographs illustrating the effects of background variations on an image.

The effect of image background variations on an image is considered first. Shown in FIG. 7A is a photographic image of a painted panel having cracks therein. It is seen from this image that the background is not of uniform intensity. Due to specular reflection a bright background is present in the upper left part of the image in FIG. 7A and, the upper right portion of the background appears almost as dark as the cracks.

Figure 7B:
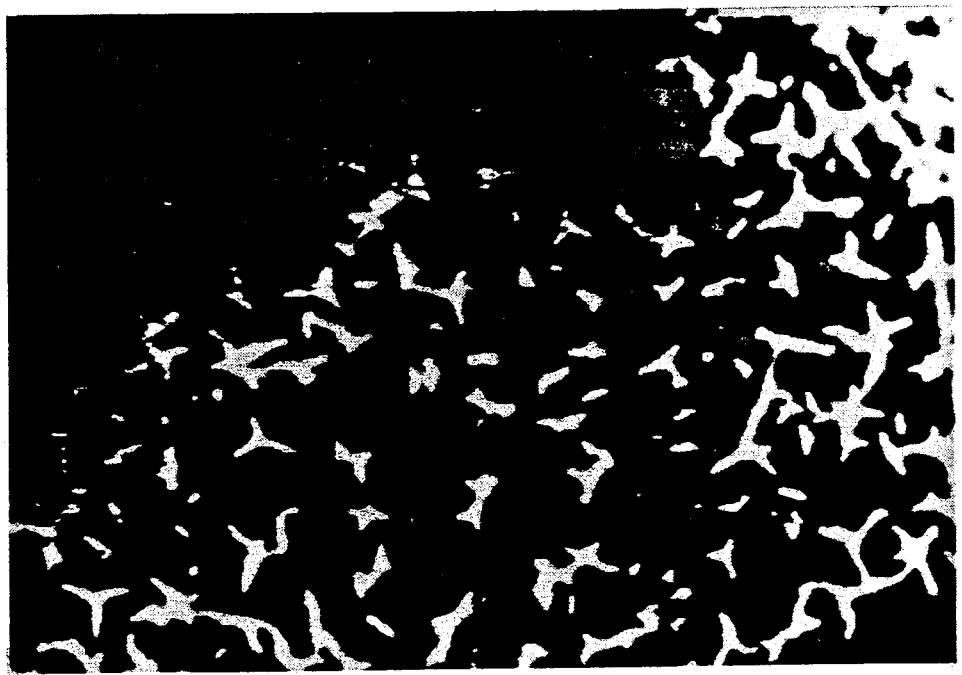
Figure 7C:
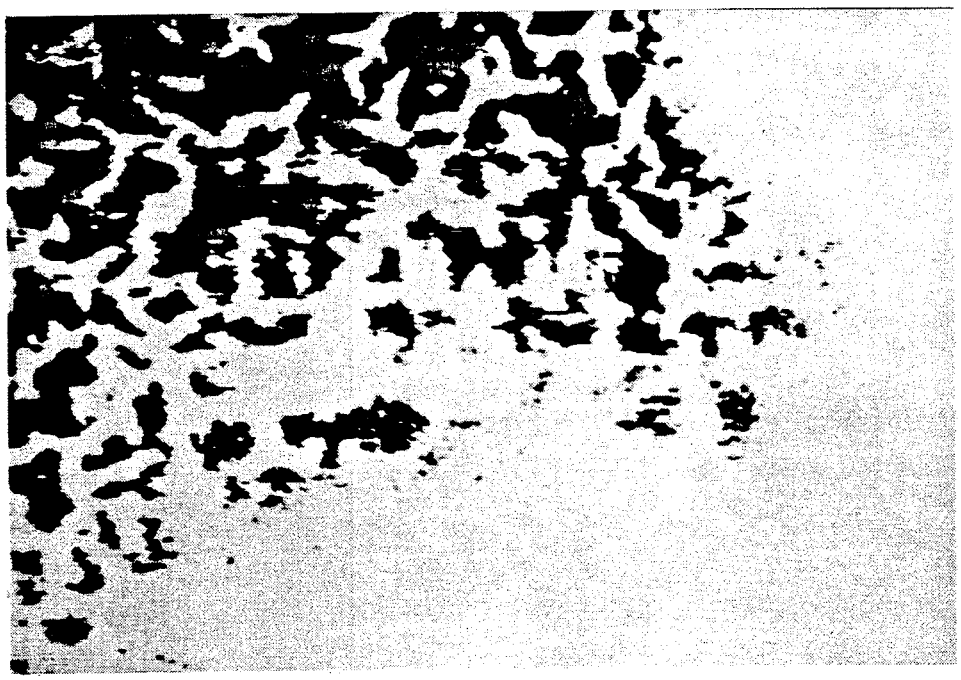
Figure 8A:
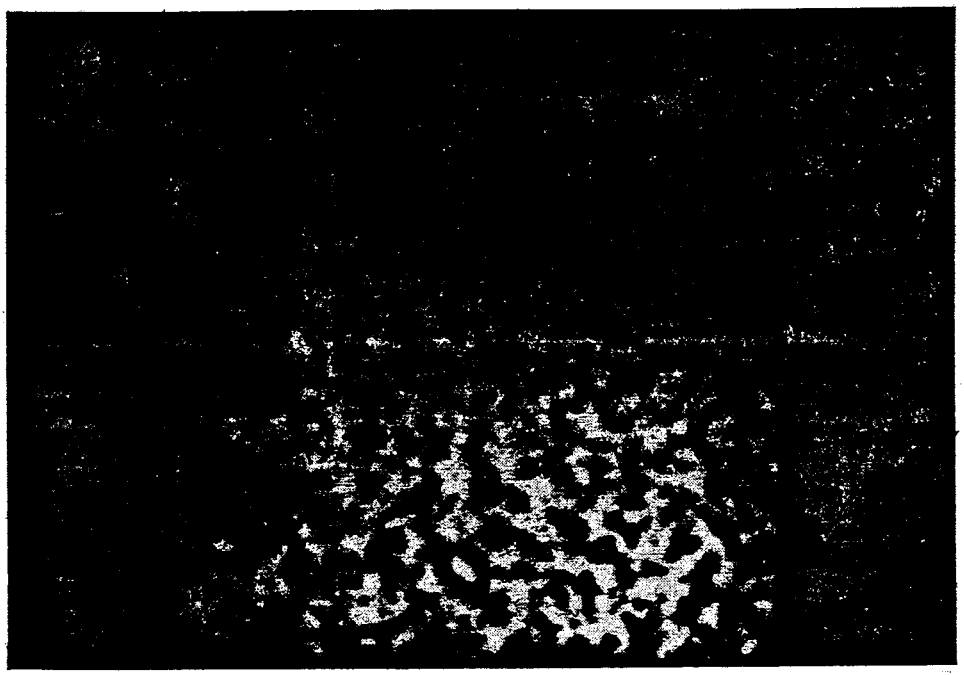
FIGS. 8A, 8B, 8C and 8D are photographs of a scene at predetermined scales of magnification.
Figure 8B:
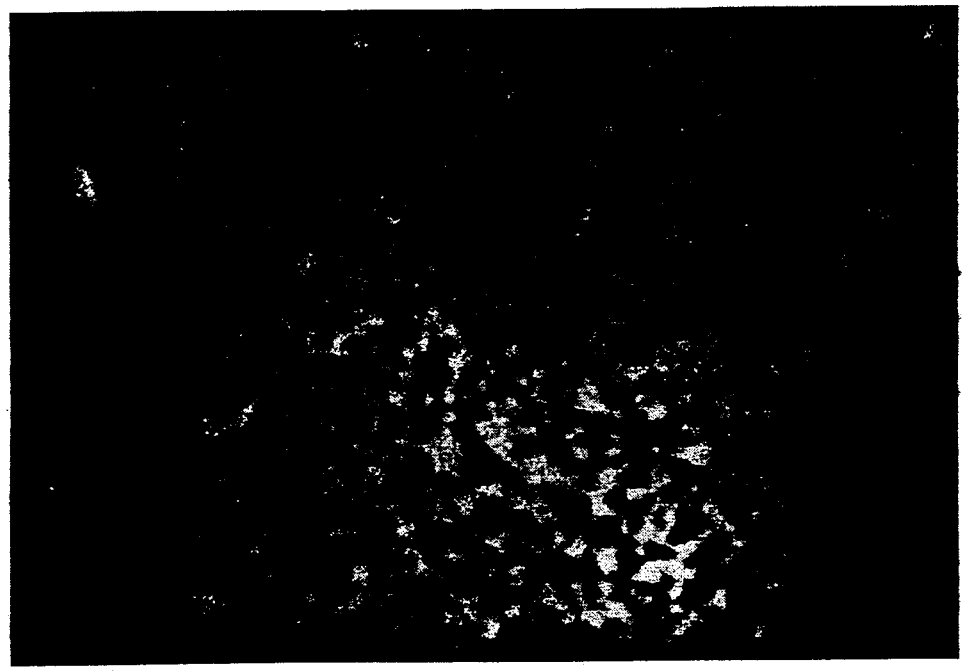
Figure 8C:
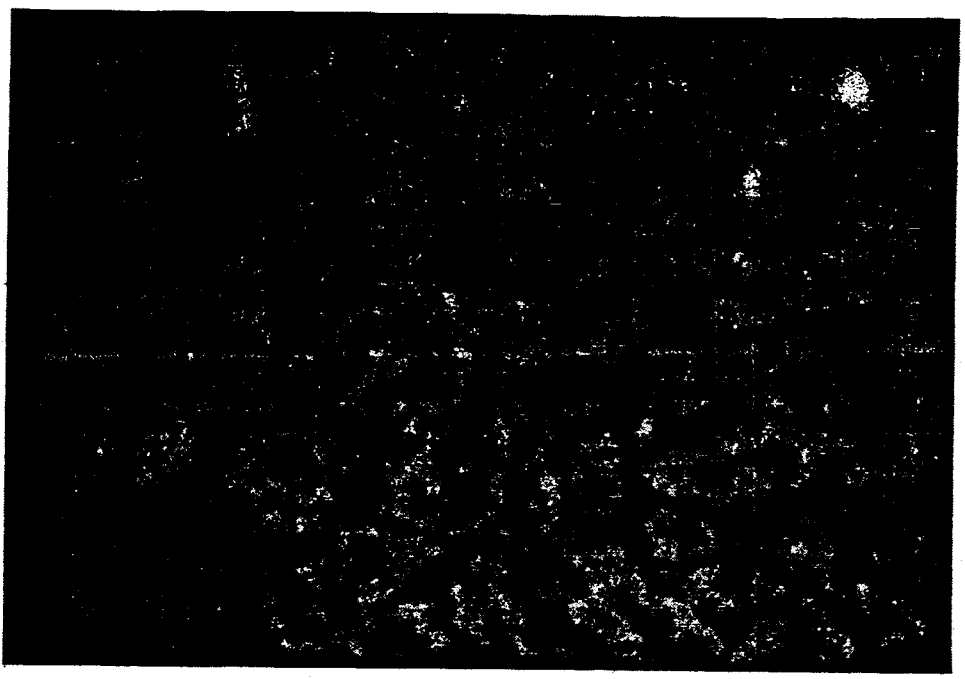
Figure 8D:

Due to this changing background, the choice of a single threshold for the entire image does not produce acceptable results. As seen in FIG. 7B if a low threshold value is chosen, the cracks in the right part of the image shown up well but the cracks on the left side do not. Alternatively, if as shown in FIG. 7C the threshold value is increased the cracks on the left show up, then the cracks on the right, that were previously visible, disappear. As will become apparent, the present invention overcomes this difficulty.

Figure 9:
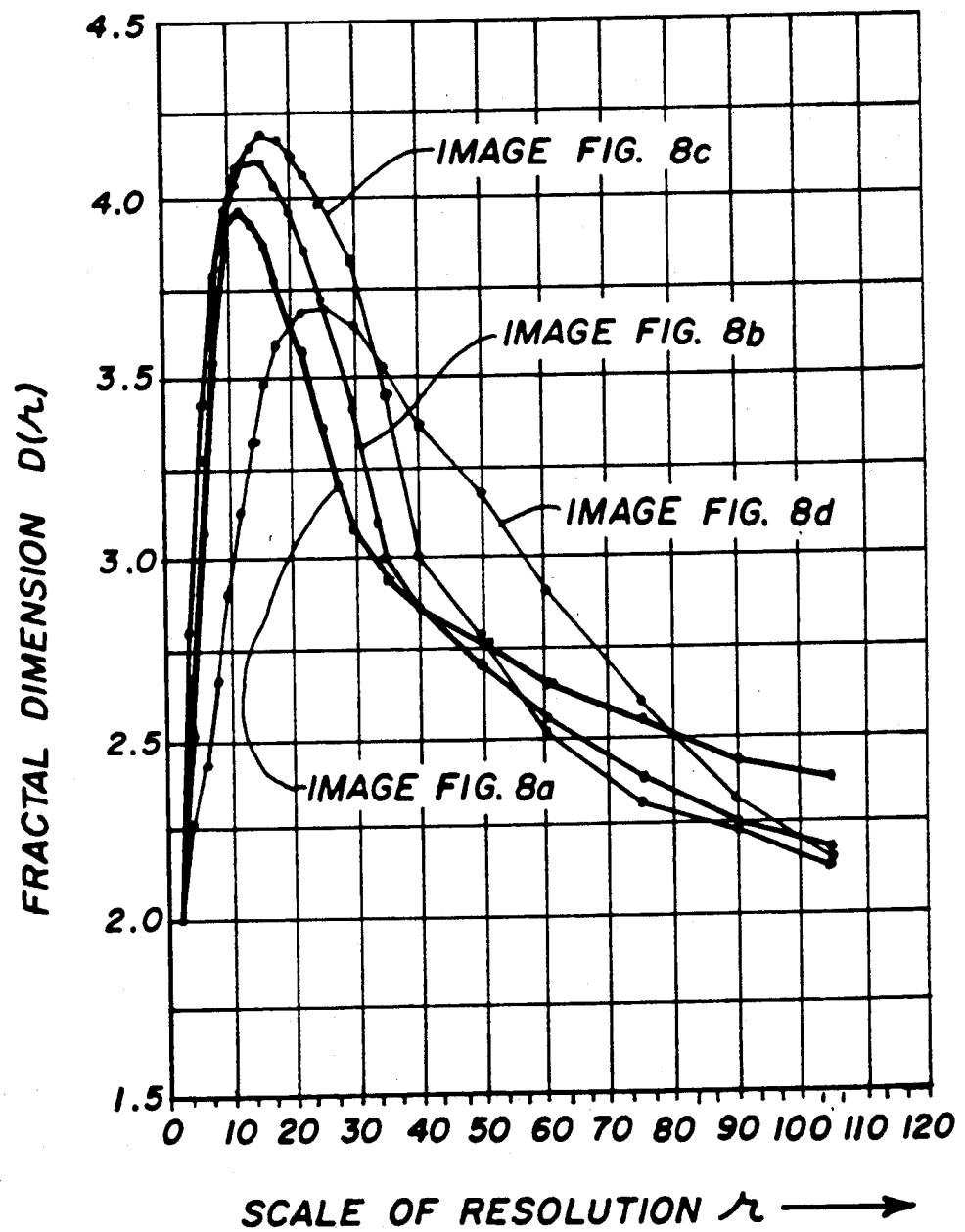
FIG. 9 is a graphical representation of the fractal dimensions of the images of FIGS. 8A, 8B, 8C and 8D, each at various scales of resolution.
Figure 10A:
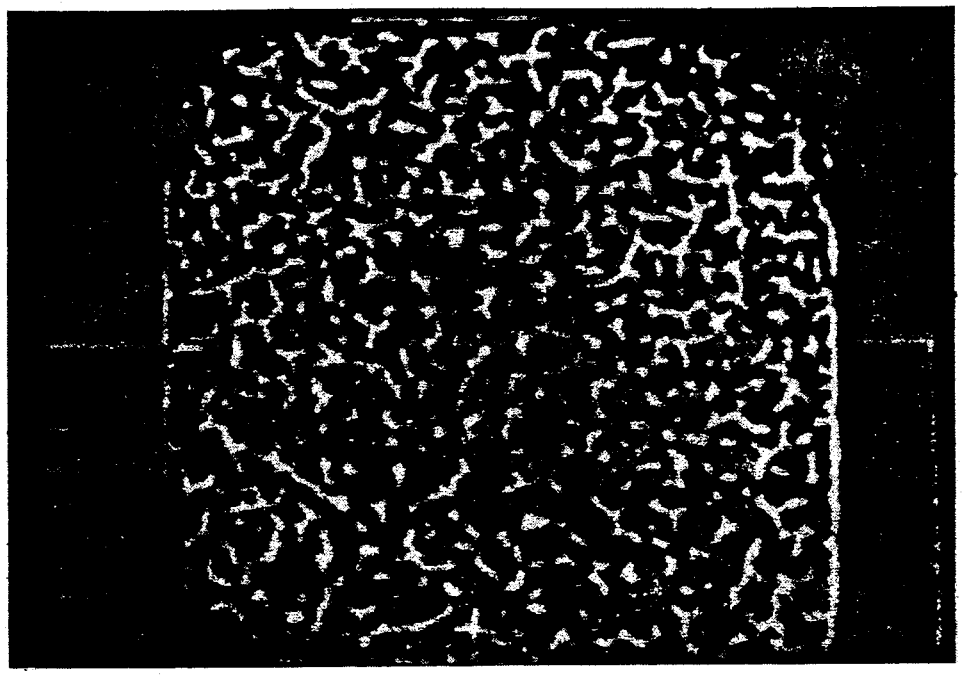
FIGS. 10A, 10B, 10C and 10D are photographs of the binary images produced using the method and apparatus in accordance with the present invention and respectively corresponding to the images of FIGS. 8A, 8B, 8C and 8D.
Figure 10B:
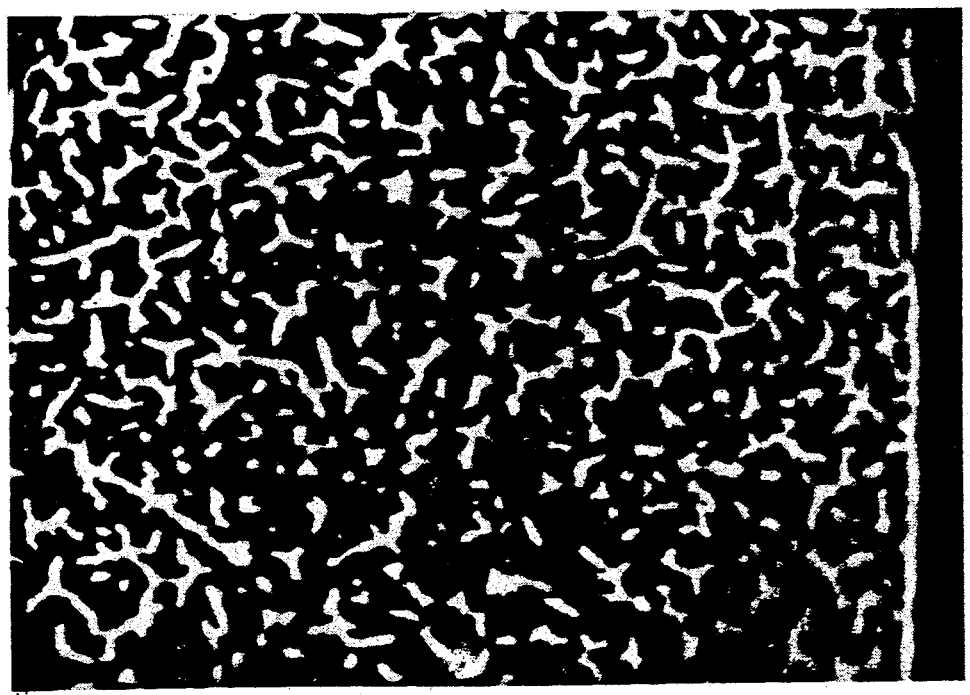
Figure 10C:
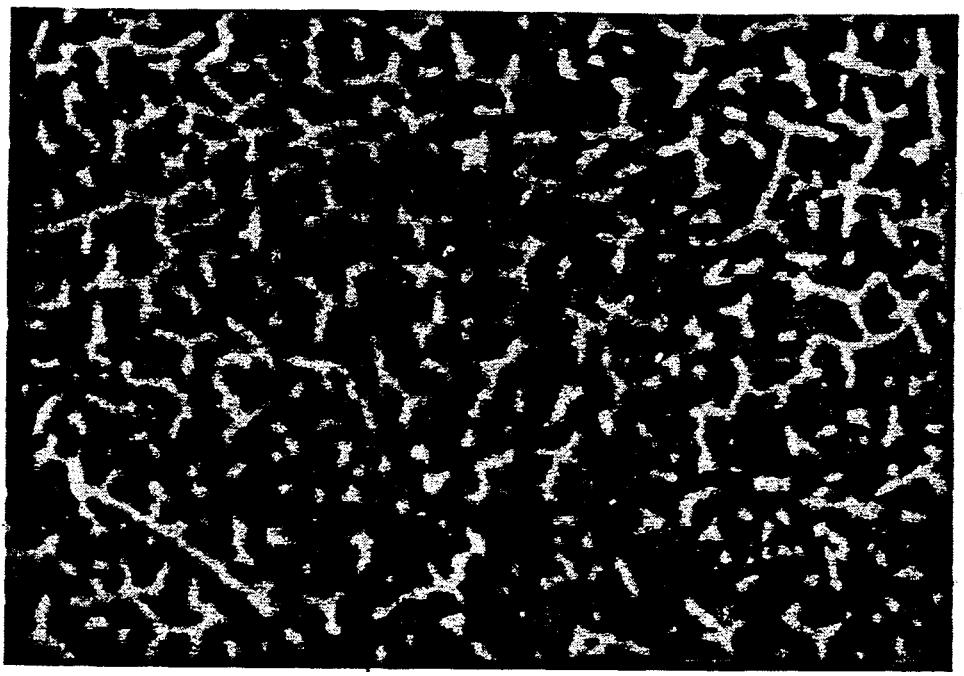
Figure 10D:
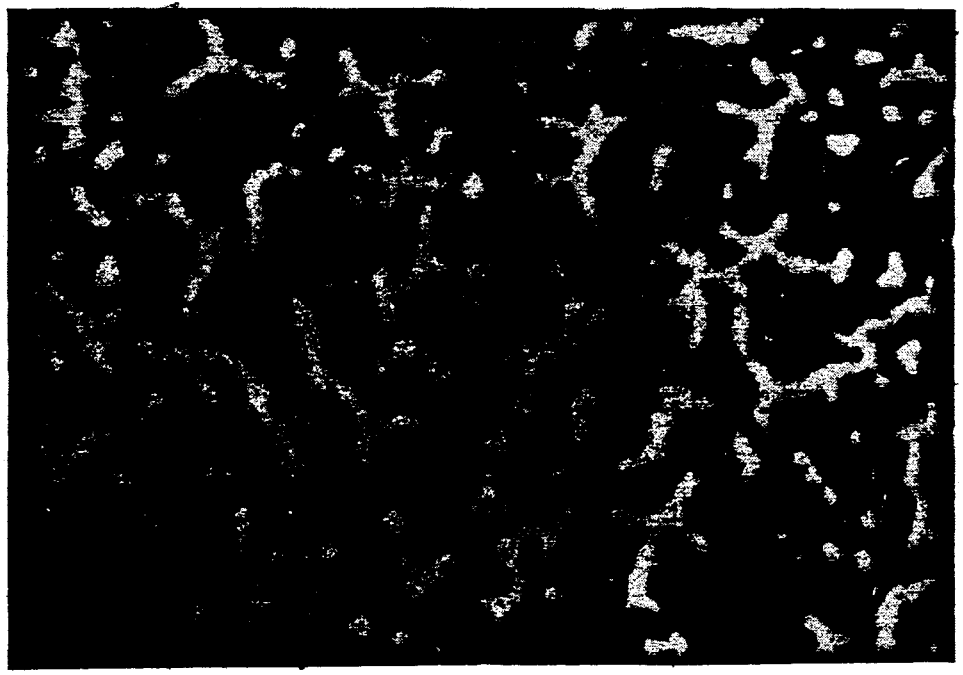

The effect of higher magnifications is next considered. FIGS. 8A, 8B, 8C and 8D show a sequence of images at consecutively higher magnifications. FIG. 9 shows a fractal dimension curve of each of the images shown in FIGS. 8A to 8D. FIG. 3, discussed earlier in general terms, shows the fractal dimension curve of the image in FIG. 8A. It peaks at a value of $r_{max}$ equal to twelve (12) pixels.

It can be seen that the fractal dimension peak shifts towards the right or larger values of r as the image magnification increases. The respective fractal dimension peaks of the images in FIGS. 8A, 8B, 8C and 8D occur at the values of $r_{max}=12$, $r_{max}=14$, $r_{max}=18$, and $r_{max}=25$, respectively. In general, it can be seen that the fractal dimension peak shifts towards the right or larger values of r as the image magnification increases. Conversely, if the magnification were lowered then the fractal dimension peak would shift towards a lower value of r.

The present invention can be used convert the image of the FIGS. 8A to 8D to avoid the problems of image background variations independently of the value of magnification of the image. As earlier set out the value $r_{max}$ at which the fractal dimension peak occurs gives us information about the scale or roughness of a texture or an indication of the average distance between similar features in an image. As discussed this information is used to define the locality (or window) from which the reference threshold is derived and which is used to calculate the binary image. Using the heuristic notion that the best magnitude locality is about 20% larger than the $r_{max}$ value FIGS. 10A, 10B, 10C and 10D illustrate the results of thresholding using this method on the images in FIGS. 8A, 8B, 8C, and 8D respectively.

It can thus be seen from FIGS. 10A, 10B, 10C and 10D that using the teachings of the present invention uniformly good thresholding is achieved in the corresponding binary images regardless of the background variations or levels of magnification -o-0-o-

Those skilled in the art, having the benefit of the teachings of the present invention as hereinabove set forth, may effect numerous modifications thereto. For example, throughout the discussion of the preferred implementation of the surface area computation set forth earlier the distance between pixels is assumed to be one (1) unit: thus a pixel with a gray level of one (1) would result in a pylon 14 in FIG. 2 that is a cube. This distance between pixels can be changed (made greater or lesser), which will result in an area computation that is different. In an extreme case, when the spacing between pixels is made very much smaller than one (1), the surface area is closely approximately by the sum of the differences in height of adjacent pixels. It should be understood, however, that this and other such modifications are to be construed as lying within the contemplation of the present invention, as defined by the appended claims.

© E. I. DuPont de Nemours and Company, Inc. 1989
All Rights Reserved

```
BYTE      F0(512,512),F1(512,512)

REAL*4    DOEF(512),CT(512),COSS(512,256),ALR(514),
1         BLR(1024),IFFT(256,512),DNS,AD,DAIRS,VS,ONE

INTEGER*4        MEMSTART, IMAD, ACC, ITT(0:255), IVER
1         ISTD, R

COMMON /SKYPR/   ACC, MEMSTART, IMAD

COMMON /THRSL/   ISTD, R

COMMON /SKY01/   CT, DOEF, COSS, ALR, IFFT, BLR,
                 ONE, DNS, AD, DAIRS, VS

COMMON /SKY02/   F0

COMMON /SKY03/   F1
```

```
       INCLUDE 'SYS$LIBRARY:IRIS_ERR.FOR/NOLIST'
       IF (IS_INIT_IRIS ('IRA0') .NE. IR$_NORMAL) GO TO 8000
       CALL IS_ERROR_MESSAGES (%VAL(1))

DO I = 0,255
           ITT(I) = I
       ENDDO

CALL IS_LOAD_OLUT (%VAL(0), ITT, ITT, ITT)
       CALL IS_LOAD_ILUT (%VAL(0), ITT)

DO I = 11,255
              ITT(I) = 255
          ENDDO
          CALL IS_LOAD_ILUT (%VAL(1), ITT)

CALL IS_DISPLAY (%VAL(0))
       CALL IS_SET_SYNC_SOURCE (%VAL(1))
       CALL IS_SELECT_OUTPUT_FRAME (%VAL(0))
       CALL IS_SELECT_OLUT (%VAL(0))
       CALL IS_SELECT_ILUT (%VAL(0))
       CALL IS_DISPLAY (%VAL(1))
C
C      Initialize the Sky Boards
C
       CALL VINIT(1,dummy,dummy)

CALL VABSET(IMAD,1)

CALL VACSET(ACC)

CALL VSKYID(IVER)
       TYPE *,' RUNNING SKY VECTOR LIBRARY VERSION NUMBER   ',IVER
       MEMSTART = '80200808'X           ! Start of memory #2 on VMX-bus CALL IS_FRAME_CLEAR (%VAL(1))
C      CALL IS_GET_FRAME (%VAL(0), F0) ! copies from FB0 to array
c      CALL IS_GET_FRAME (%VAL(0), F1) ! copies from FB0 to array
       CALL IS_PASSTHRU ()
       TYPE *,'Type 0 for stored image or 1 for live image'
       ACCEPT *, IMAG
          IF (IMAG .EQ. 0) THEN
              CALL IS_FREEZE_FRAME ()
              CALL IS_FRAME_CLEAR (%VAL(0))
              CALL LOAD_IMAGES()
              CALL IS_GET_FRAME (%VAL(0), F0) ! copies from fb0 to array
c             CALL SINES                       ! stores the sinusoid
c             CALL IS_PUT_FRAME (%VAL(0), F0) ! copies from array to fb0
          ELSE
              CALL IS_FREEZE_FRAME ()
              CALL IS_GET_FRAME (%VAL(0), F0)
          END IF
       CALL COSSES CALL FRFT                        ! Compute 2D fft appropiately scaled

CALL FRACTL                      ! COMPUTES THE FRACTAL DIMENSION

CALL WNDO                        ! Smooth image based on window istd   = 5

CALL IS_PUT_FRAME (%VAL(1), F1)

type *,' type 0 (white features)or type 1 image ?'
       accept *,imag
       if ( imag .eq. 0) then
           CALL IS_SUBTRACT_FRAMES (%VAL(1), %VAL(0))
           CALL IS_PERFORM_FEEDBACK (%VAL(0), %VAL(1))
       else
           call is_subtract_frames (%val(0), %val(1))
           call is_exchange_frames (%val(0), %val(1))
           call is_perform_feedback (%val(0), %val(1))
       endif
8000   CONTINUE
       CALL VDONE

STOP
       END
```

```
        SUBROUTINE COSSES
C
C
C       Computes the matrix of cosine coefficients
C REAL*4      DOEF(512),CT(512),COSS(512,256),ALR(514),
                    BLR(1024),PI,W,AI,IFFT(256,512),DNS,AD,DAIRS,
                    VS,ONE

INTEGER*4   MEMSTART,IMAD,ACC

COMMON /SKYPR/  ACC, MEMSTART, IMAD

COMMON /SKY01/  CT, DOEF, COSS, ALR, IFFT, BLR,
                        ONE, DNS, AD, DAIRS, VS

PI   = 4.*ATAN(1.)
        W    = 2.*PI/512.
        ONE  = 1.

DO I = 1,511
              AI = FLOAT(I)
              DOEF(I+1) = W*AI
        ENDDO

DOEF(1) = PI
        CALL VCOS(DOEF, 1, ACC, 2, 512, 'SP')
        CALL VNEG(ACC, 2, ACC, 2, 512, 'R', 'SP')
        CALL VSADD(ONE, ACC, 2, ACC, 2, 512, 'R', 'SP')
        CALL VSDIV(ONE, ACC, 2, CT, 1, 512, 'R', 'SP')
        CALL WAIT

DO I = 1,255
        CALL VSADD(CT(I+1), CT, 1, COSS(1,I+1), 1, 512, 'R', 'SP')
        CALL WAIT
        COSS(1,I+1) = 1.
        ENDDO

COSS(1,1) = 0.
        DO I = 2,512
              COSS(I,1) = -1.
        ENDDO

RETURN
        END

SUBROUTINE FRFI

BYTE F0(512,512)

INTEGER*4 ACC, IMAD, MEMSTART, ISTD, R

REAL*4  DOEF(512),CT(512),COSS(512,256),ALR(514),IFFT(256,512),
                BLR(1024),ONE,DNS,AD,ADD,DAIRS,VS,VAR,STD

COMMON /SKYPR/  ACC, MEMSTART, IMAD

COMMON /THRSL/  ISTD, R

COMMON /SKY01/  CT, DOEF, COSS, ALR, IFFT, BLR,
                        ONE, DNS, AD, DAIRS, VS

COMMON/SKY02/   F0                ! Sky common area for byte image

DNS  = 2./(512.*512.)
```

```
        DO I = 1,480
              IMAD = MEMSTART + ((I-1)*2056)
              CALL VB2SP(F0(1,I), DOEF, 1, 512)
              CALL VSFFTW(DOEF, 1, IMAD, 1, 9, 'R', 'SP')
        CALL WAIT
        ENDDO

CALL VMOV(IMAD, 1, ALR, 1, 257, 'C', 'SP')
              CALL WAIT
        DO I =480,512
              IMAD = MEMSTART + ((I-1)*2056)
              CALL VMOV(ALR, 1, IMAD, 1, 257, 'c', 'SP')
              CALL WAIT
        ENDDO

C
C       computation of the fft along the second dimension.
C

ADD      = 0.
        DO J = 1,257
           IMAD = MEMSTART + ((J-1)*8)
           CALL VSFFT(IMAD, 257, IMAD, 257, 9, 'C', 'SP')
           call wait
        END DO
        DO J = 1,256
           IMAD = MEMSTART + ((J-1)*8)
              CALL VMGSQ(imad, 257, IFFT(J,1), 256, 512, 'SP')
              CALL VMOVW(IFFT(J,1), 256, ACC, 2, 512, 'R', 'SP')
              CALL VSUM(AD, ACC, 2, 512, 'R', 'SP')
              CALL VSMUL(DNS, ACC, 2, ACC, 2, 512, 'R', 'SP')
              CALL VMUL(ACC,2,COSS(1,J),1,IFFT(J,1),256,512,'R','SP')
              CALL WAIT
              ADD = ADD + AD
        ENDDO C
C       E[(x-m)(x-m)]    =  E[(x)(x)] - m*m
C IMAD      = MEMSTART
        CALL VMGSQ(IMAD, 1, AD, 1, 1, 'SP')
        CALL WAIT
        VAR       = ADD - AD
        VAR       = VAR*(DNS*DNS/2.)
        STD       = SQRT(VAR)
        ISTD      = NINT(STD)

RETURN
        END

INTEGER*4     PR(20),I,L,K,IR,LR,MEMSTART,IMAD,ACC,ISTD,R

REAL*4        ALR(514),COSS(512,256),IFFT(256,512),DOEF(512),
      *               CT(512),AREA(20),D(20),ONE,DNS,AD,PI,W,AI,AIR,
      *               AIRS,DAIRS,VS,SUM,BLR(1024),DMAX

COMMON /SKYPR/    ACC, MEMSTART, IMAD

COMMON /THRSL/    ISTD, R

COMMON /SKY01/    CT, DOEF, COSS, ALR, IFFT, BLR,
      *                   ONE, DNS, AD, DAIRS, VS

DATA PR/2,4,6,8,10,12,14,16,18,20,22,25,30,35,
      1 40,50,60,75,90,105/

PI = 4.*ATAN(1.)
        W  = 2.*PI/512.

DO I = 0,511
              AI = I
              DOEF(I+1) = W*AI
        ENDDO
```

```
        CALL VCOS(DOEF,1,ACC,2,512,'SP')
        CALL VNEG(ACC,2,ACC,2,512,'R','SP')
        CALL VSADD(ONE,ACC,2,DOEF,1,512,'R','SP')
        CALL WAIT

DO I = 1,20
            IR    = PR(I)
            AIR   = FLOAT(IR)
            AIRS  = AIR*AIR
            DAIRS = 1./AIRS

DO L = 0,511
                LR = MOD(L*IR,512) + 1
                ALR(L+1) = DOEF(LR)
            ENDDO

SUM = 0.

DO K = 1,256
                CALL VSMUL(DAIRS,IFFT(K,1),256,ACC,2,512,'R','SP')
                CALL VSMUL(ALR(K),ALR,1,ACC,3,512,'R','SP')
                CALL VMUL(ACC,2,ACC,3,ACC,2,512,'R','SP')
                CALL VSUM(VS,ACC,2,512,'R','SP')
                CALL WAIT
                SUM = SUM + VS
            ENDDO

SUM = SUM*DAIRS
            AREA(I) = SUM + 512.*512.
            TYPE *,I,AREA(I)
        ENDDO
C
C       COMPUTE FRACTAL DIMENSION
C
        D(1) = 2.
        DMAX = 2.
        DO I = 2,20
            D(I) = 2. - (ALOG10(AREA(I))-ALOG10(AREA(I-1)))/
1               (ALOG10(FLOAT(PR(I)))-ALOG10(FLOAT(PR(I-1))))
            TYPE *,I,D(I)
        IF (D(I) .GE. DMAX) THEN
            DMAX   = D(I)
            R      = I
        ELSE
        ENDIF
        ENDDO

R     = PR(R+1)

RETURN
        END

BYTE F0(512,512),F1(512,512)

INTEGER*4 ACC,IMAD,MEMSTART,R,IR, ISTD

REAL*4  DOEF(512),CT(512),COSS(512,256),ALR(514),IFFT(256,512),
                BLR(1024),ONE,DNS,AD,ADD,DAIRS,VS,VAR,STD,AR

COMMON /SKYPR/   ACC, MEMSTART, IMAD

COMMON /THRSL/   ISTD, R

COMMON /SKY01/   CT, DOEF, COSS, ALR, IFFT, BLR,
                         ONE, DNS, AD, DAIRS, VS

COMMON/SKY02/    F0

COMMON/SKY03/    F1

1101    format(2e15.8)
        vs      = 0.
```

D(r) — 50

54

```
              DO I = 1,514
                 ALR(I) = 0.
              ENDDO
              DO I = 1,1024
                 BLR(I) = 0.
              ENDDO

IR    = ((R+1)/2) - 1
              IR    = 511-IR
              AR    = 1./FLOAT(R*R)
C
C      Set up a line of spatial window data
C
              DO I = 1,R
                 IJ = MOD(IR+I,512) + 1
                 ALR(IJ) = AR
              ENDDO
C
C      fft of the line set above
C
              CALL VSFFT(ALR, 1, ALR, 1, 9, 'R', 'SP')
              call wait DO J = 1,256
                 JK = J*2 - 1
                 IMAD = MEMSTART + ((J-1)*8)

DO I = 1,R
                       IJ = MOD(IR+I,512) + 1
                          IK = IJ*2 - 1
                          BLR(IK)   = ALR(JK)
                          BLR(IK+1) = ALR(JK+1)
                    ENDDO

CALL VSFFT(BLR, 1, ACC, 2, 9, 'C', 'SP')

CALL VMOV(IMAD, 257, ACC, 3, 512, 'C', 'SP')

CALL VMUL(ACC, 2, acc, 3, imad, 257, 512, 'C', 'SP')

CALL WAIT
              ENDDO

C
C      INVERSE FOURIER TRANSFORM OF THE CONVOLUTE
C
              ONE  = 0.
              AD   = 255.

DO I = 1,257
                    IMAD = MEMSTART + ((I-1)*8)
                    CALL VSIFT(IMAD, 257, IMAD, 257, 9, 'C', 'SP')
                    CALL WAIT
              ENDDO

DO I = 1,512
                    IMAD = MEMSTART + ((I-1)*2056)
                    CALL VSIFT(IMAD, 1, DOEF, 1, 9, 'R', 'SP')
C                   CALL VCLIPW(ONE,DOEF,1,DOEF,1,512,'SP')
C                   CALL VCLIPW(AD,DOEF,1,DOEF,1,512,'SP')
                    CALL VSP2BW(DOEF, 1, F1(1,I), 512)
                    CALL WAIT
              ENDDO

RETURN
              END
```

What is claimed is:

1. A method of converting a two dimensional gray level image to a corresponding binary image comprising the steps of:

subdividing the two dimensional image into a predetermined number of picture elements each of which has a gray level associated therewith;

computing, from the two dimensional image, the surface area A(r) of a corresponding hypothetical three dimensional surface overlying the plane of the two dimensional image, the height that a portion of the hypothetical surface lies above a given pixel in the two dimensional image being functionally related to the gray level of the pixel;

determining the fractal dimension of the hypothetical surface by computing the change in the logarithm of the area A(r) with respect to the change in the logarithm of the scale of resolution r in accordance with the relationship $$D = 2 - d[\log A(r)]/d[\log (r)]$$

determining the scale of resolution $r_{max}$ at which the fractal dimension is a maximum;

determining a reference threshold gray level for each pixel in the two dimensional image, each reference threshold gray level being functionally related to the gray levels of each pixel lying within a predetermined locality about a given pixel, the dimensions of the predetermined locality being functionally related to the value $r_{max}$; and converting the gray level of each pixel in the two dimensional image into a corresponding binary representation thereof by comparing the gray level of each pixel with the reference threshold gray level for the locality surrounding that pixel and assigning a binary value to the pixel in accordance with the results of the comparison.

2. The method of claim 1 wherein the predetermined locality has a square shape and wherein the dimension of the locality exceeds the value $r_{max}$ by a predetermined amount.

3. The method of claim 2 wherein the predetermined distance dimension of the locality exceeds the value $r_{max}$ by less than twenty percent (20%).

4. The method of claim 1 wherein the computation of the surface areas A(r) is performed in the Fourier domain.

5. The method of claim 2 wherein the computation of the surface areas A(r) is performed in the Fourier domain.

6. The method of claim 3 wherein the computation of the surface areas A(r) is performed in the Fourier domain.

7. Apparatus for converting a two dimensional gray level image to a corresponding binary image comprising:

means for subdividing the two dimensional image into a predetermined number of picture elements each of which has a gray level associated therewith;

means for computing, from the two dimensional image, the surface area A(r) of a corresponding hypothetical three dimensional surface overlying the plane of the two dimensional image, the height that a portion of the surface lies above a given pixel in the two dimensional image being functionally related to the gray level of the pixel;

means for determining the fractal dimension of the hypothetical surface by computing the change in the logarithm of the area A(r) with respect to the change in the logarithm of the scale of resolution r in accordance with the relationship $$D = 2 - d[\log A(r)]/d[\log (r)],$$

means for determining the scale of resolution $r_{max}$ at which the fractal dimension is a maximum;

means for generating a reference threshold gray level for each pixel in the two dimensional image, each reference threshold gray level being functionally related to the gray level in each pixel lying within a predetermined locality about a given pixel, the dimensions of the predetermined locality being functionally related to the value $r_{max}$; and means for converting the gray level of each pixel in the two dimensional image into a corresponding binary representation thereof by comparing the gray level of each pixel with the reference threshold gray level for the locality surrounding that pixel and assigning a binary value to the pixel in accordance with the results of the comparison.

8. The apparatus of claim 7 wherein the computation of the surface areas A(r) is performed in the Fourier domain.

* * * * *